Sept. 16, 1924.

J. T. MACKIE

GANG SAW EDGER

Filed May 4, 1923

Inventor
J. T. Mackie.

By Albert F. Dietrich
Attorney

Sept. 16, 1924.
J. T. MACKIE
GANG SAW EDGER
Filed May 4, 1923
1,508,606
2 Sheets-Sheet 2
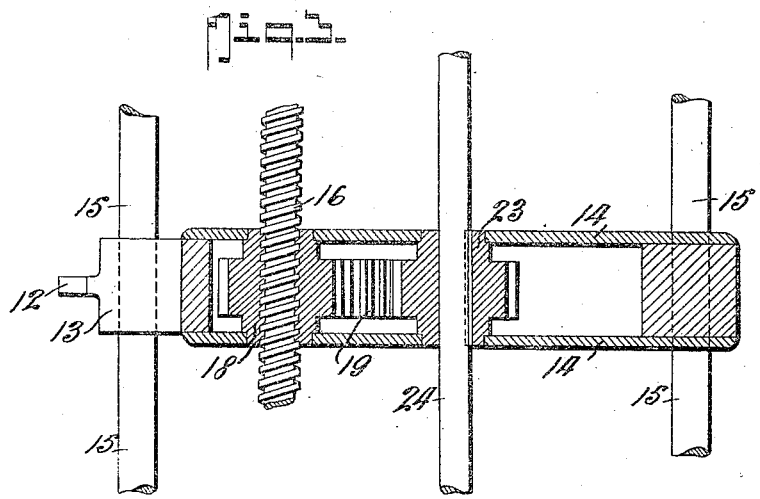
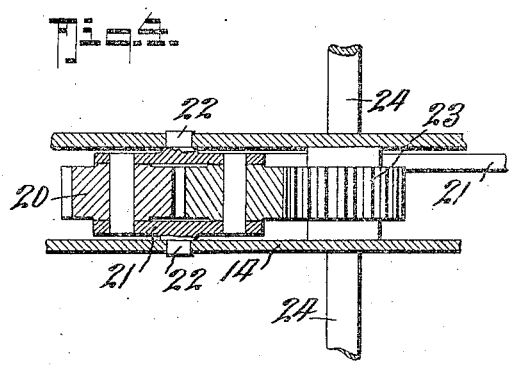
Inventor
J. T. Mackie.
By Albert E. Dieterich
Attorney Patented Sept. 16, 1924.

1,508,606

UNITED STATES PATENT OFFICE.

JAMES T. MACKIE, OF NEW WESTMINSTER, BRITISH COLUMBIA, CANADA.

GANG-SAW EDGER.

Application filed May 4, 1923. Serial No. 636,674.

*To all whom it may concern:*

Be it known that I, JAMES T. MACKIE, citizen of the Dominion of Canada, residing at New Westminster, in the Province of British Columbia, Canada, have invented certain new and useful Improvements in Gang-Saw Edgers, of which the following is a specification.

This invention relates to a means for spacing the saws of a gang saw edger on the arbor or shaft on which they are carried.

These edging saws are now made of large size to cut heavy lumber and require a considerable effort to move them along the saw shaft in adjusting them to the desired width of timber required. As the time of the sawyer is valuable, this work of adjusting the saws should be more rapidly performed than can be done by manual labour and it is desirable that the sawyer should be relieved of such work.

In the invention, which is the subject of this application, a simple, direct and mechanically satisfactory means is applied for endwise moving the saws along the saw shaft, which operating means may be connected to the mechanism of the saw that the work of endwise moving the saws may be done by the power which drives the machine. There is also provision for securing the saws in any desired position of adjustment.

The invention is particularly described in the following specification, reference being made to the drawings by which it is accompanied, in which:

Fig. 3 is a sectional plan to an enlarged scale on the line 3—3 in Fig. 1, and

Fig. 4 is a similarly enlarged detail through the gear box on the line 4—4 in Fig. 1, looking in the direction of the arrows.

Figure 1:
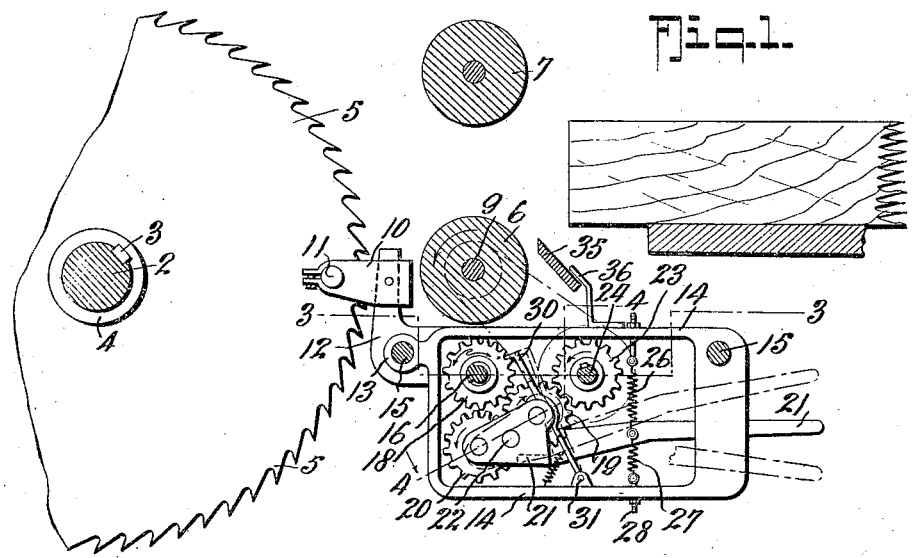
Fig. 1 is a side elevation of the mechanism showing its application to one of the saws of a gang, the cover plate of the gear box being removed.
Figure 2:
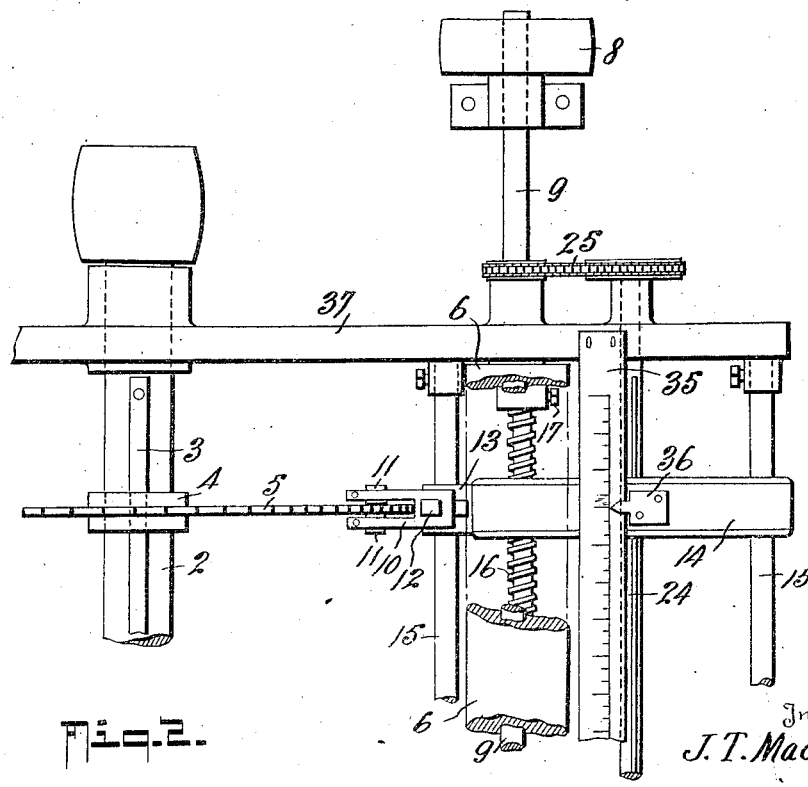
Fig. 2 is a plan of the same adjacent one end of the machine.

In these drawings 2 represents the shaft of the saw which is provided with a feather 3 on which the hubs 4 of the several saw plates are lengthwise movable along the shaft, to adjust the saws to the required distance apart. The feed rollers through which the lumber is fed to the edging saws are represented by 6 and 7, the lower one of which is a live roller driven in any suitable manner as by a belt pulley 8 secured on the roller shaft 9.

Each saw plate 5 is endwise moved on the feathered shaft 2 by a jaw member 10 having lignum vitæ contact pieces 11 which engage the opposite faces of the saw plate. This jaw member 10 is removably mounted on an upward projection 12 from the forward bearing 13 of the gear box 14 which is slidably mounted on two supporting rods 15 secured across the frame of the machine parallel to the axis of the saw shaft 2.

A gear box 14 is provided for each saw and each is independently movable on the slide rods 15 by a screw 16 parallel to the slide rods and the saw shaft, which screw is fixed against rotation in the frame of the machine by set screws 17. The fixed screw 16 passes through a nut 18 rotatably mounted in each gear box, the outer circumference of which nut has teeth to mesh with those of corresponding pinions 19 or 20 rotatably mounted in a handled frame 21, which is pivoted intermediate the pinions 19 and 20 on trunnion bearings 22 in the gear box, that the teeth of either pinion 19 or 20 may be moved into mesh with those of the nut 18.

These pinions 19 and 20 mesh together and are therefore driven in opposite directions by a pinion 23 mounted between the side plates of the gear box to move endwise on a feathered shaft 24, which shaft is driven by an endless chain 25 from the shaft 9 of the live roller 6 or other convenient part of the machine.

The handled end of the pinion carrying frame 21 projects through the end of the gear box which is further from the saws, so that the operator, by moving the handled end of the pinion carrying frame 21 upward from the neutral position, shown by the full lines in Fig. 1, to the position indicated by the dot and dash lines in the same figure, the teeth of the pinion 19 are brought into mesh with those of the nut 18, without withdrawing the teeth of 19 from engagement with those of the driving pinion 23: Conversely, if the handled end of 21 is moved downward, as indicated by the dot and dash lines in the same figure, the teeth of the pinion 20 are moved into mesh with those of the nut 18 while 20 is in driving connection with the pinion 23 through the pinion 19 acting as an intermediate gear and driving the pinion 20 in the direction opposite to 19.

Rotation of the nut 18 in either direction will, by virtue of the fixed screw 16, move the gear box and its connected parts endwise along the screw and along the guide rods 15, according to the direction in which the nut 18 is rotated, the driving pinion 23 being endwise movable the while on the feathered shaft 24.

The pinion carrying frame 21 is maintained in the neutral position, with both pinions 19 and 20 out of mesh with the nut 18, by springs 26 and 27 connected between a pin on the frame 21 and the upper and lower side of the gear box respectively, and adjustable in such connection by nuts 28.

To ensure that, while the pinions 19 and 20 are out of mesh, the nut 18 shall be locked against rotation, and therefore that the saws are maintained in the position to which they are set, a detent lever 30 is pivoted at 31, the free end of which lever is turned toward and fits between the teeth of the nut 18. Intermediate its ends this detent lever fits against the hub or other projection of the pinion carrying frame 21, that movement of that frame in either direction, will withdraw the detent end of the lever from engagement with the nut teeth, before the teeth of either pinion 19 or 20 are brought into mesh with those of the nut 18.

A graduated bar 35 is secured across between the side frames 37 of the machine and an indicating pointer 36 is secured to the upper side of each gear box to facilitate setting the saws to any desired distance apart.

In use, the shaft 24 with the pinions 23, 19 and 20 being driven from the live feed roller 6, the operator can at any time while the machine is running, readily adjust the several saws successively or simultaneously to the desired position, by raising or lowering the handled end of the pinion carrying frame 21 according to the direction the saw or saws are required to move, so that the operator is relieved of the labour of moving the saws and the work can be more quickly performed.

Having now particularly described my invention, I hereby declare that what I claim as new and desire to be protected in by Letters Patent, is:

1. In a gang saw edger, the combination with the saw shaft and saws endwise movable thereon and rotatable with it, of means for separately moving each saw endwise on the saw shaft, said means comprising a screw secured against rotation across the frame of the machine to be parallel with the axis of the saw shaft, a nut for each saw rotatably mounted on the screw, a power means and means for engaging and disengaging each nut thereto for rotating the nut, and means for so connecting the nut to its saw that endwise movement of the nut due to its rotation on the screw will impart a corresponding endwise movement to the saw of its shaft.

2. In a gang saw edger, the combination with the saw shaft and saws endwise movable thereon and rotatable with it, of means for separately moving each saw endwise on the shaft, said means comprising a screw parallel with the axis of the saw shaft and secured against rotation, a nut for each saw rotatably mounted on the screw, means preventing rotation of the nut, means for withdrawing such preventing means, and means co-operative with such withdrawing means for rotating the nut in either direction, and means connecting the nut to its saw to move the saw endwise on its shaft as the nut moves endwise on its screw when rotated.

3. In a gang saw edger, the combination with the saw shaft and saws endwise movable thereon and rotatable with it, of means for separately moving each saw endwise on the shaft, said means comprising a screw parallel with the axis of the saw shaft and secured against rotation, a nut for each saw rotatably mounted on the screw, means for rotating the nut in either direction, means connecting the nut to the saw to move the saw along its shaft as the nut is moved along its fixed screw when rotated, means maintaining the nut rotating means out of driving engagement with the nut, and means preventing rotation of the nut when the rotating means is withdrawn.

4. In a gang saw edger, the combination with the saw shaft and saws endwise movable thereon and rotatable with it, of means for independently moving each saw endwise on the shaft, said means comprising a screw parallel to the saw shaft which screw is fixed against rotation, a pinion for each saw threaded as a nut to fit the screw, means for connecting this nut pinion to its saw to travel the saw endwise along the shaft, a drive shaft parallel and adjacent the screw, means for rotating this shaft from an operative part of the machine, a pinion rotatable with the shaft and endwise movable on it, means for retaining the drive shaft pinion in the plane of the nut pinion, a handled frame connected to travel with the nut pinion and pivotally mounted in such connection, pinions mounted in the frame one on each side of the pivot, the teeth of which pinions mesh with one another and one of them in mesh with the drive pinion, means for moving either of the pinions in the frame into mesh with the nut pinion while the teeth of the other pinion are withdrawn from such engagement, and means for normally holding the frame with both pinions out of engagement with the nut pinion.

5. In a gang saw edger, the combination with a saw shaft and saws endwise movable thereon and rotatable with it, of means for independently moving each saw endwise on the shaft, said means comprising a gear box for each saw, guideways parallel to the saw shaft on which guideways each gear box is separately slidable, a screw secured against rotation with its axis parallel to that of the saw shaft which screw passes through the several gear boxes, a pinion within each gear box threaded to rotate as a nut on the fixed screw, means projecting from each gear box for engaging the opposite faces of its saw plate, a drive shaft parallel to the fixed screw and passing also through the several gear boxes, means for rotating this shaft, a pinion in each gear box rotatable with the drive shaft and endwise movable on it, a frame pivotally mounted in each gear box and having a handled end projecting through it by which the frame may be moved on its pivot, two pinions rotatably mounted in the pivoted frame one on each side of its pivot, the teeth of which pinions mesh with one another and the teeth of one of the pinions mesh with those of the pinion on the drive shaft, means normally maintaining the pinion carrying frame with the teeth of its pinions clear of engagement with those of the nut pinion on the fixed screw, means for securing the nut pinion against rotation when the frame pinions are out of engagement with it, and means for bringing the teeth of either of the frame pinions separately into engagement with the teeth of the nut pinion.

In testimony whereof I affix my signature.

JAMES T. MACKIE.